United States Patent [19]

Bowker et al.

[11] 4,113,829

[45] Sep. 12, 1978

[54] METHOD OF FORMING A BELL END ON THERMOPLASTIC PIPE

[75] Inventors: Donald R. Bowker, Cerritos; Donald J. Klein, Downey; Stephen E. Rados, Norwalk, all of Calif.

[73] Assignee: Philips Industries Inc., Dayton, Ohio

[21] Appl. No.: 656,538

[22] Filed: Feb. 9, 1976

[51] Int. Cl.² ............................ B29F 1/00; B29C 5/00; B29D 23/00
[52] U.S. Cl. .................................. 264/295; 264/318; 264/320; 264/336
[58] Field of Search .............. 264/334, 336, 230, 348, 264/237, 318, 327, 250, 251, 294, 234, 295, 320; 425/DIG. 58, 392, 393, 243

[56] References Cited

U.S. PATENT DOCUMENTS

| | | | |
|---|---|---|---|
| 3,150,222 | 9/1964 | Blaustein et al. | 264/318 |
| 3,247,548 | 4/1966 | Fields et al. | 264/318 |
| 3,344,942 | 10/1967 | Hedgewick | 264/318 |
| 3,557,278 | 1/1971 | Kuhlemann | 264/318 |
| 3,584,092 | 6/1971 | Alexandris | 264/318 |
| 3,932,094 | 1/1976 | Korff et al. | 264/318 |
| 3,960,472 | 6/1976 | O'Connor et al. | 264/318 |

Primary Examiner—Willard E. Hoag
Attorney, Agent, or Firm—Lyon & Lyon

[57] ABSTRACT

Method of making grooved, bell-ended thermoplastic pipe. In order to remove the core from undercuts, most of the molded article is cooled until substantially rigid while the bell-end is cooled more slowly. The article is ejected from the mold while the bell end is still soft enough to be deformed during ejection but recovers its shape after removal from the mold.

29 Claims, 6 Drawing Figures

METHOD OF FORMING A BELL END ON THERMOPLASTIC PIPE

Injection molding of the entire plastic article such as pipe or pipe fittings, i.e., including the simultaneous formation of the gasket race(s) therein, is accomplished by means of this invention. The parts of the molding apparatus, in closed position, include a split mold base or cavity means generally defining the external configuration of the hollow plastic article together with core means defining the internal configuration of the hollow plastic article. The core means is axially movable from the cavity means so that it may be ejected from the hollow plastic article in a multiple stage pull-out at a particular instant in the processing cycle.

Molten plastic is first injected into the hollow article forming mold means. Next, that molten plastic injected into the mold means, which comprises the body portions of the article, (i.e., the non-flared portions) are then cooled to a relatively cool first temperature range (at about 150° F. – 200° F. for PVC) within which temperature range the body portions are substantially rigid and not deformable, while the grooves or races of the article are cooled, at a lower cooling rate, to a second temperature range at which the plastic of the bell ends are resiliently deformable, such temperature range of the bell ends being generally about 30°–100° F. hotter than the main body portions. Thus, for example, with PVC as the material of the article, the bell ends attain a temperature within a second temperature range of 220°–280° F.

The mold means remains closed until the bell ends and body portions reach the required temperature ranges above stated. At that point, the split cavity means are opened, and external core pieces, defining a portion of the external surface of the grooves or races, are retracted in a first-stage axial pull-out, followed by the timed ejection, or second-stage axial pull-out of internal core inserts defining the interior of the grooves or races. The second stage retraction of the internal core inserts is readily accomplished because: (1) the temperature of the material forming the grooves or race lies within a temperature range wherein the bell ends are resiliently deformable, i.e., forcible axial pull-out of the internal core inserts from the internal annular grooves or races are accomplished without any damage and the grooves or races then return to their original molded shape because of a "memory" that the plastic material exhibits under these time and temperature conditions; and (2) the temperature of the body portions of the plastic article, itself, are maintained at a sufficiently cool temperature so that the body portions have become substantially rigid and do not appreciably deform during the forcible second stage pull-out of the internal core insert from the groove or race area. To further prevent deformation of the cooler body portions during internal core insert retraction, the body portions are preferably provided with annular retention ring integrally molded thereon.

A third stage pull-out of the remaining core means within the hollow article is then made after which the molded article is ejected by conventional ejection means.

The molded article may now be in its final form or in some cases, further molding operations can be performed such as pressurizing certain areas of the article in a second mold means to form a generally spherical segmental area to more greatly resist fluid pressure. A pipe coupling having bell ends formed on the ends thereof together with a generally spherical segment formed within the body portion of the coupling is novel and inobvious to one skilled in the art.

BACKGROUND OF THE INVENTION

This invention relates, especially to the forming of large diameter plastic pipe and fittings having bell ends, The term "fittings" generally includes Tees, Ell's, 30°, 45° and 90° elbows, pipe couplings, end caps, wyes, other angles, and the like. The term "bell end" on a plastic pipe or pipe fitting denotes an enlarged end, with respect to the outer diameter of the remaining portion of the pipe fitting, which enlarged end is provided with an annular groove in its inner surface normally adapted to receive an annular resilient gasket. The term "plastic" as used herein, and in the claims, generally denotes thermoplastic material, examples of which are polyvinylchloride (PVC), acrylic butadiene-styrene polymers (ABS), polyethylene and styrenebutadiene polymers.

Pipe fittings are capable of transferring tremendous quantities of fluid at high pressure only if joints between the pipe fittings and the pipe proper are properly sealed. Solvent welding of pipe to the pipe fitting, whether it be ells, 45° bends, tees, eyes, couplings, or whatever, may be employed but have drawbacks in terms of quality control, during assembly, especially in large diameter fittings. The irrigation, water distribution, and sewer/drain industries are therefore moving to the use of pipe fittings with flared or bell ends wherein annular races are formed at the ends of the pipe fittings, the annular races being adapted to accept annular rubber gaskets for fluid-tight sealing with an adjoining piece of pipe.

The problem in the industry has been one of economically manufacturing, on a mass production basis, bell ends in metal or plastic pipe fittings. Many companies presently machine the recesses or races which, of course, is costly. Others (e.g., Shupe, U.S. Pat. No. 3,474,999) have tried to mold the race at the same time the entire part is made and then, by means of a system of internal metal cores at the race which collapse inwardly, the internal metal cores are removed from the race to then permit removal of the part. This leads to very complicated tooling and also, consequently, great expense.

The patented art also reveals the use of deformable (elastomeric) internal cores, to form the bell ends, e.g., Huck, U.S. Pat. No. 3,377,659, Axelrod, U.S. Pat. No. 2,714,226 and Muhlner, U.S. Pat. No. 3,520,047 and Patent No. 3,507,505. Shupe, supra, explains the disadvantages of using elastomeric mold materials, as internal mold pieces, e.g., the necessity for frequent replacement of such a mold, the difficulty of removal of such molds from the completed race, and the real possibility of permanent deformation of such mold piece itself from its intended shape after frequent usage.

One of the inventors herein, namely Donald Bowker, is generally aware of a process and apparatus, practiced in a country foreign to the United States of America, in which rigid internal axially retractable cores have been utilized to form bell ends in plastic pipe fittings. So far as he is aware, such process and apparatus utilizes a split cavity in which a two-part mold means is placed defining the part to be molded. The two part mold has an outer part defining the external portion of the bell end and has an inner core which is fully retracted after the outer portion of the mold means is retracted. Cooling means to chill both the cavity and the mold means (and thereby the part to be molded) are utilized.

While chilling of the cavity and mold means is of advantage in achieving a relatively high production rate, it is believed that still further economies of production can be realized by utilizing a specific temperature differential within the mold means, per se, and/or by achieving a multiple stage retraction of the inner core of the mold means, rather than by a single stage retraction of the inner core, as in the just-mentioned process of which Mr. Bowker is aware. Further, Mr. Bowker is not aware of the use of a means to achieve a specific temperature differential which includes a high-conductivity metal for the mold piece defining the body portion of the fitting together with a dissimilar low-conductivity metal for the mold pieces defining the bell end portion of the fitting.

BRIEF SUMMARY OF THE INVENTION

This invention is directed, first, to a method for forming a hollow thermoplastic article, such as a pipe fitting, having an enlarged bell end with an inner annular groove and a body portion having at least a section thereof of smaller inner diameter than the diameter of said inner annular groove of said bell end. The method comprises the steps of:

(a) introducing molten plastic into a hollow article forming mold means including a cavity means and core means which cavity and core means together, in closed position, define said bell end and said body portion, said core means being movable, with respect to said cavity means, from a closed position to at least one partially retracted position and thence to a fully retracted position clear of said cavity means and said cavity means being openable to enable said article to be ejected from said cavity means;

(b) rapidly cooling the molten plastic of at least a first part of said body portion, while said mold means is in closed position, to a first temperature range within which said plastic forming said first part of said body portion is substantially rigid and non-deformable and simultaneously, (c) relatively slowly cooling the molten plastic forming said bell end, while said mold means is in closed position, to a second temperature range in which said plastic forming said bell end remains resiliently deformable, said second temperature range being substantially higher than said first temperature range;

(d) in sequence, partially retracting said core means to thereby remove said core means defining said bell end, while the plastic forming said bell end lies within said second higher temperature range and said first part of said body portion lies within said first lower temperature range, and then, fully retracting said core means; and (e) ejecting said formed thermoplastic article from said cavity means.

Preferably, the cavity means is opened prior to core retraction. The retraction of that portion of the core means occurs at the time that the higher temperature range is reached and is readily accomplished because of the maintenance of a temperature within that temperature range, at the bell end, within which the plastic thereof is resiliently deformable — i.e., forcible retraction or pullout of the internal core insert from the bell end deforms the bell end but the deformation is of a resilient nature, and the bell end returns to its originally molded condition because of an inherent "memory" property exhibited by the plastic under these temperature and time conditions. Also, the temperature of the body portion of the plastic part, itself, simultaneously attains a sufficiently cool temperature such that the body portion is rigidified and does not appreciably deform during the forcible removal of the internal core insert from the groove or race area of the bell end. In this connection, the body portion is preferably provided with an annular, integral, retaining ring to thereby prevent deformation or movement of the body portion during retraction of the core means defining the bell end.

This invention is also directed to an apparatus for the forming of hollow plastic articles such as plastic pipe and pipe fittings having an enlarged or bell end. The apparatus for performing the method, above-described, includes:

(a) a split, openable, cavity means;

(b) a slip core means, together with said cavity means, defining said first longitudinal section of said body portion of said hollow article;

(c) external and internal core pieces, defining with said cavity means, external and interior surfaces, respectively, of said inner annular groove in said bell end;

(d) means for opening said cavity means;

(e) drive means for sequentially retracting first, said external core pieces from said cavity means, retracting, secondly, said internal core pieces from said cavity means and retracting thirdly said slip core means from said cavity means;

(f) means for maintaining said external and internal core pieces within a first given temperature range whereby the plastic forming said inner annular groove of said bell end is resiliently deformable during the sequential removal of said external and internal core pieces; and (g) means for maintaining at least said first longitudinal section of said body portion of said article at a second given temperature substantially below the temperature of said inner annular groove of said bell end at the time of retraction of said core pieces and slip core means.

The cavity means of the apparatus of the invention is preferably provided with an annular undercut whereby an annular retaining ring is formed in the body portion of the thermoplastic article.

The maintenance of the required temperature differential is achieved by a judicious selection of heat-retentive and heat-conductive materials, by means of a coolant system for the body portions, and by means of insulating sleeves to insulate the bell ends from the coolant system.

Thus, the core pieces, defining the bell end of the article may be made of a relatively high capacity, heat retentive, metallic material (such as stainless steel) and the slip core piece defining the interior of the body portion of the article may be cooled, by fluid, and may also be made of a highly heat conductive material, such as aluminum, in order to cool the body of the article as quickly as possible. The slip core defining the body portion of the article is preferably insulated from the core pieces defining the groove or race of the article.

The foregoing sequence of opening of the cavity means and of retraction of external core pieces, internal core pieces and internal slip cores happens very quickly - in the space of a few seconds or less.

DESCRIPTION OF THE PREFERRED EMBODIMENT

Figures 5, 6:
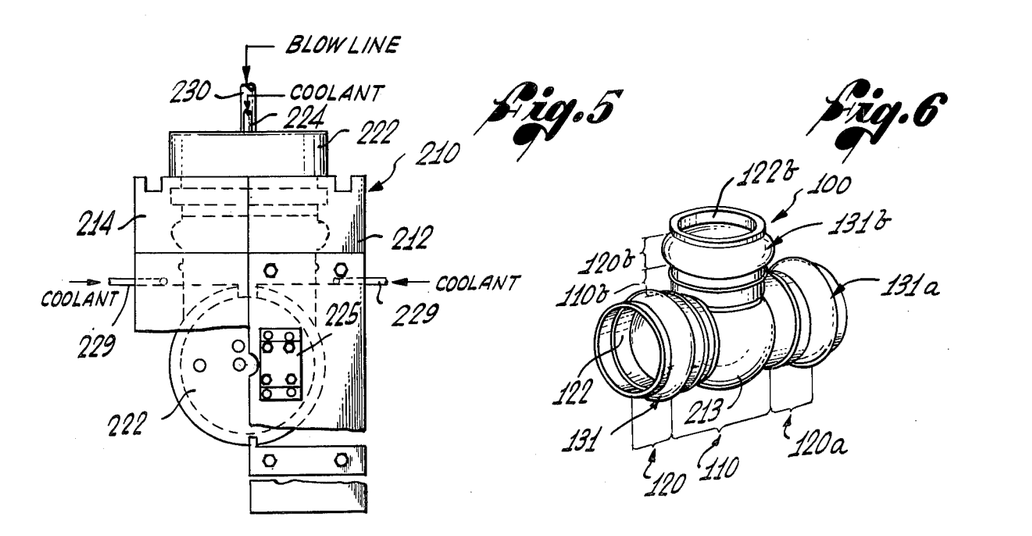
FIG. 5 is an end view of FIG. 4, in the direction indicated by the arrow 5, in FIG. 4.
FIG. 6 is a perspective view of the final part, as ejected from the apparatus of FIG. 4.

The hollow article to be molded, by the method and apparatus of this invention, is shown by way of example only as a Tee pipe fitting 100 in FIG. 6. The Tee fitting is basically comprised of body portions 110, 110b and bell end portions 120, 120a, and 120b. (The parts of the Tee fitting 100 will all be designated with a numeral in the 100 series while the parts of the apparatus will all be designated by numbers in the 10 series). The body portion 110 extends from the exterior annular shoulder 131 of bell end 120 to the annular shoulder 131 of bell end 120a, i.e., along the arms of the Tee, and the body portion 110b extends upwardly along the stem of the Tee, to exterior annular shoulder 131b of bell end 120b, as shown best in FIG. 6.

Each bell end 120, 120a, 120b has formed, in the interior surface thereof, inner annular grooves or races 122, 122a, 122b, respectively, which grooves or races are adapted to receive resiliently deformable gaskets (not shown).

Figure 1:
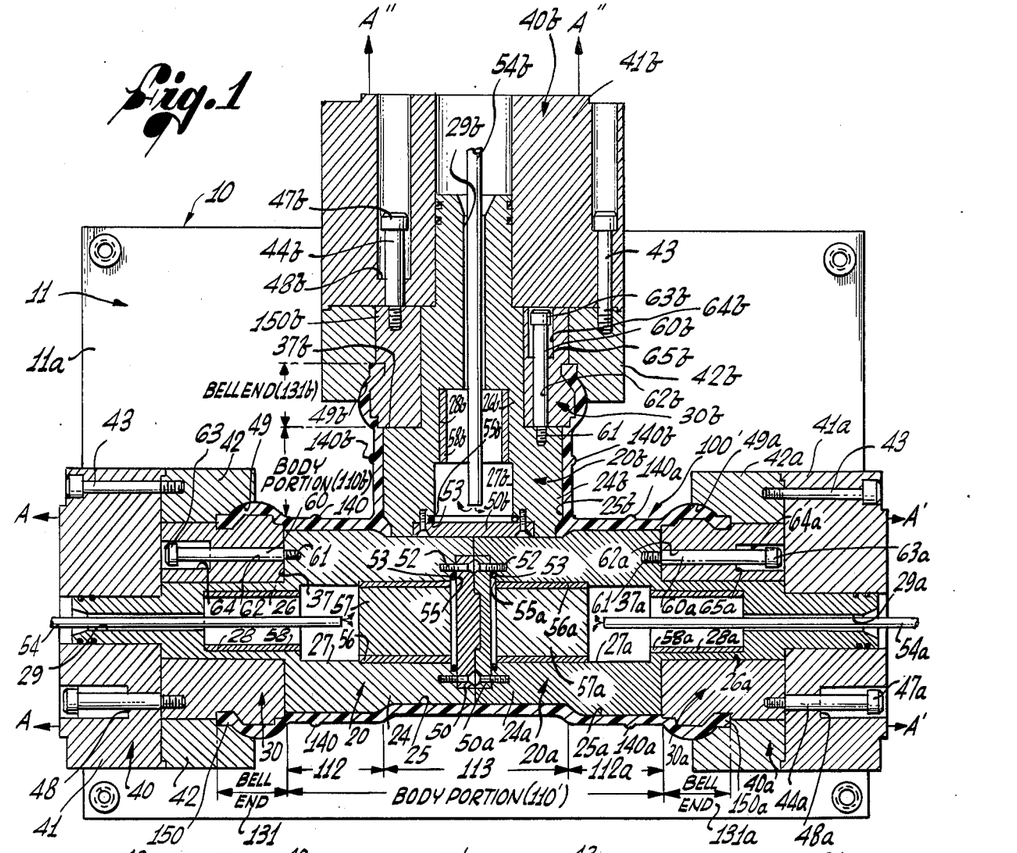
FIG. 1 is a side elevational view, in axial cross-section, of a Tee pipe fitting mold assembly in closed position showing the molded part.
Figure 2:
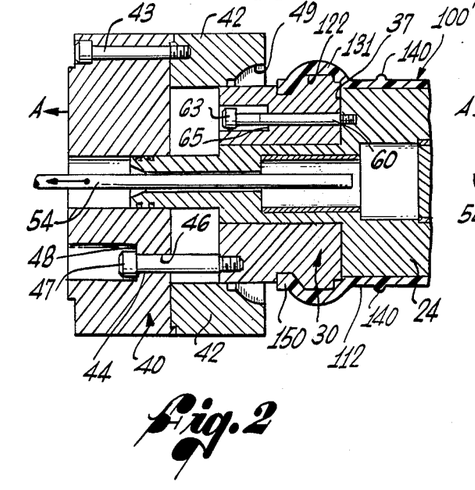
FIG. 2 is a fragmentary view of FIG. 1 showing the left-hand portion thereof, in which a first-stage retraction or pull-out, of the external core piece, from the part, is shown.
Figure 3:
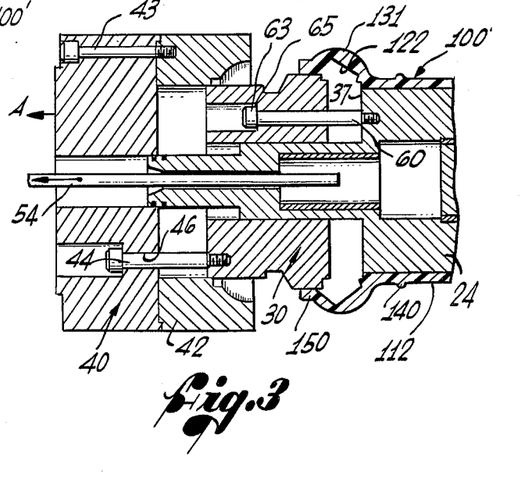
FIG. 3 is a fragmentary view of FIG. 1 wherein a second stage of retraction of the internal core insert piece from the part, is shown.

Referring now particularly to FIGS. 1-3 of the drawings, a side elevational view, in axial cross-section, of a mold means 10, for an intermediate form (100′) of the Tee shaped pipe fitting 100, is shown. The finished fitting 100 differs from the intermediate form 100′ in having a generally spherical segment formed in body portion 110, in a second mold means, as will be described.

The mold means 10 includes a split mold base, one half of which contains the cold cavity, the cold cavity side of the mold base being shown in FIGS. 1-3 and being designated by the numeral 11a. The other half of the split mold base contains the hot cavity, the molten plastic for the article entering the mold means 10 through a sprue means provided in the hot cavity. The hot cavity is essentially the mirror image of the cold cavity side, or means 11a, and is not shown in the drawings. The hot and cold cavity sides of the split mold base are sometimes referred to in the specification and claims, generally as "cavity means". The cavity means is designated by the numeral 11.

The mold means 10 also includes a series of core means, which together with the cavity means 11, defines the intermediate form 100′ of the hollow pipe fitting 100 to be molded, 100′ differing only in the shape of body portion 110′.

The core means includes three slip core means 20, 20a, 20b; three core inserts 30, 30a, 30b; and three outer core pieces 40, 40a, 40b. The slip core means 20, 20a, 20b are generally cylindrical, and together with the cavity means 11, defines longitudinal cylindrical sections of the body portions 110, 110b. The external core pieces 40, 40a, and 40b, and internal core pieces 30, 30a, 30b, together with the cavity means 11 define the external and internal surfaces of the bell ends 131, 131a, and 131b.

Referring now to the core means in greater detail, the internal slip cores 20, 20a, 20b are each formed of a highly conductive metal, such as an aluminum alloy, each slip core 20, 20a, 20b comprising, respectively, a main hollow cylinder 24, 24a, 24b of relatively large diameter, the outer cylindrical surfaces 25, 25a, 25b of which generally define the interior surfaces of the body portions 110′, 110b of the fitting 100′. Integrally affixed to the main cylinders 24, 24a, 24b of the slip cores 20, 20a, 20b are smaller-diametered cylindrical slip core extensions 26, 26a, 26b, respectively, to which extensions are mounted, for slidable limited movement, the internal and external core pieces 30, 30a, 30b and 40, 40a, and 40b.

The slip cores 20, 20a, 20b have enlarged bores 27, 27a, 27b, respectively, formed therein, which bores function as passages for cooling fluid, for the purpose of cooling at least a portion of the main cylinders 24, 24a, 24b. Each of the enlarged bores 27, 27a, 27b opens into smaller-diametered bores 28, 28a, 28b, provided within slip core extensions 26, 26a, 26b, which bores 28, 28a, 28b further open into still smaller bores 29, 29a, 29b, respectively.

Affixed to the innermost ends of each of the slip cores 20, 20a, 20b are water caps 50, 50a and 50b, respectively. The water caps are affixed to the slip cores 20, 20a, 20b in a fluid-tight manner, preferably by means of a series of flat-headed screws 52, with Rubber O-rings 53 being press-fitted between the inner face of each of the water caps 50, 50a, 50b and the annular walls of cavities 55, 55a, 55b formed near the inner ends of each of slip cores 20, 20a, 20b, respectively.

Small-diametered pipes 54, 54a, 54b pass through the bores 28, 29, 28a, 29a, and 28b, 29b, respectively, terminating within enlarged bores 27, 27a, 27b, respectively. These pipes carry coolant fluid, e.g., water at 35°-40° F. into bores 27, 27a and 27b to thereby cool by heat exchange, all or a portion of the main cylinders 24, 24a, 24b. In order to selectively cool only a portion of the main cylinders 24, 24a, 24b, PVC insulating cylindrical sleeves 56, 56a are mounted within an innermost portion of the bores 27, 27a, and plastic plugs 57, 57a are inserted within the sleeves 56, 56a in a water-tight manner. When water enters bores 27, 27a, through pipes 54, 54a, the water will cascade against plastic plugs 56, 56a and exit through bores 28, 29 and 29a, respectively. The greatest amount of cooling occurs in that portion of the main cylinders 24, 24a which are not insulated from the coolant fluid, so that outermost longitudinal, cylindrical sections of body portion 110′, designated 112, 112a will be cooled much more rapidly than the section 113 therebetween. As will be later described in more detail, section 113 in this manner, attains a temperature wherein it remains somewhat pliable, for a subsequent molding operation in a second mold means, while sections 112, 112a of fitting 100′ are, at the same time, substantially rigid and non-deformable, and will not be deformed during retraction of the core means.

Pipe 54b also carries coolant fluid into the enlarged bore 27b of main cylinder 24b, and will rapidly cool body portion 110b of fitting 100' by means of heat exchange between aluminum cylinder portion 24b and body portion 110b, since no insulating sleeve is mounted within bore 27b.

The bell end portions 131, 131a, 131b of fitting 100' are insulated from the exiting coolant fluid by means of the interpositioning of additional cylindrical plastic sleeves 58, 58a, 58b within bores 28, 28a, 28b, respectively, the plastic sleeves presenting a heat exchange barrier between coolant fluid and the said bell ends 131, 131a, and 131b.

Internal core pieces 30, 30a, 30b, preferably made of heat-retentive stainless steel, are slidably mounted onto each of the slip core extensions 26, 26a, 26b, so that in the fully closed position of the core means (shown in FIG. 1) the internal core pieces abut the shoulders 37, 37a, 37b of each of the main slip core cylinders 24, 24a, 24b, respectively. Each of the internal core pieces 30, 30a, 30b is provided with an external surface conforming exactly to the inner surface of the bell ends 131, 131a, 131b of the Tee shaped pipe fitting 100 including the inner annular groove or race 122, 122a and 122b.

The internal core pieces 30, 30a, 30b are preferably mounted to the slip cores extensions 26, 26a, 26b by means of a series of shoulder slide bolts 60, 60a, 60b. The inner ends 61 of the slide bolts 60, 60a, and 60b are threadably affixed to the main cylinders 24, 24a, 24b of slip cores 20, 20a, 20b, respectively, the shank of the slide bolts being slidably movable within bolt channels or passages 62, 62a, 62b formed within the internal core pieces 30, 30a, 30b, respectively. The outermost ends of the passages 62, 62a, 62b are enlarged, as shown at 64, 64a, and 64b to accomodate bolt heads 63, 63a, 63b, respectively, which are integrally formed on the outer ends of the slide bolts 60, 60a, and 60b.

The external core pieces 40, 40a, 40b each comprise an external main core piece 41, 41a, 41b and an external core extension 42, 42a, 42b threadably attached to each of the main core pieces 41, 41a, 41b, respectively, by shoulder bolts 43. The external core extensions 42, 42a, 42b each have formed therein, an annular surface 49, 49a, 49b, corresponding to a portion of the external surface of each of the bell ends 131, 131a, 131b.

The external core pieces 40, 40a, 40b are mounted for limited, axially slidable, movement, to the internal core pieces 30, 30a, 30b, respectively, by means of slide bolts 44, 44a, 44b slidably movable within bolt channels 46, 46a, 46b, respectively. The limit of axially slidable movement of external core pieces 40, 40a, 40b, with respect to internal core pieces 30, 30a, 30b, is reached when the heads 47, 47a, 47b of slide bolts 44, 44a, 44b strike (i.e., abuts) the shoulders 48, 48a, 48b within bolt channel 46, 46a, 46b. The maximum extent of relative movement of external core pieces (e.g., core piece 40) to internal core pieces (e.g., core piece 30) is seen in FIG. 2 after the first stage of retraction or pull-out has occurred. It will be noted in FIG. 2 that the external bell end forming surface 49 of core extension 42 has been fully retracted from the bell end 131 to thereby permit retraction of the internal core piece 30 from the inner surface of bell end 131, as shown in FIG. 3.

In the second stage of retraction, shown in FIG. 3, internal core pieces 30, 30a, 30b are forcibly moved axially, with respect to slip cores 20, 20a, 20b, respectively, in the directions A, A' and A", respectively, until the bolt heads 63, 63a, 63b of bolts 60, 60a, 60b strike the shoulders 65, 65a, 65b formed by the juncture of passages 62 and 64, 62a, and 64a, and 62b and 64b, respectively. In FIG. 3 the maxmium extent of the second stage retraction of internal core piece 30 relative to slip core 20 is clearly shown. It will be noted that, in this position, bolt head 63 abuts shoulder 65 thus limiting relative movement of core piece 30 to slip core 20 at the point where the annular groove forming surface of core piece 30 has been retracted from the inner annular groove 122 of bell end 131.

Upon completion of the second stage retraction, as shown in FIG. 3, the slip core 20, 20a, 20b is then fully retracted, in a third stage, from the cavity means 11 and the part ejected from the cavity means in a conventional manner.

The internal core pieces 30, 30a, 30b, and the core extensions 42, 42a, 42b of external core pieces 40, 40a, 40b are preferably made of stainless, a material which is relatively heat retentive as compared to aluminum. In this way, the bell ends 131, 131a, 131b are completely surrounded by relatively heat-retentive die material whereas longitudinal sections 112, 112a, of the body portion 110' and body portion 110b of the fittng 100' are in contact with the heat conductive die surfaces of slip cores 20, 20a and 20b.

The cavity means 11 is preferably provided with annular undercuts adjacent the body portions 112, 112a and 110b of fitting 100' in order that annular retention rings, of slightly larger diameter than the body portion 110' (e.g., one-eighth of an inch oversize) are molded into the aforesaid body portions of fitting 100. The retention rings, designated by the numerals 140, 140a, 140b are provided for the purpose of positively retaining the cooler body portions 112, 112a, and 110b intact, and without deformation, during retraction of the internal core pieces 30, 30a, 30b from the hotter bell ends 131, 131a, and 131b.

Conventional drive means may be employed to sequentially open the cavity means 11 followed by the three-stage timed retraction of the external core pieces 40, 40a, 40b, the internal core insert pieces 30, 30a, 30b, and the slip core means 20, 20a, 20b, respectively. For example, the external core pieces 40, 40a, 40b may be slidably bolted to a motorized drive means (not shown) which initiates the three stage removal in a timed sequential manner. Thereafter, the fitting 100' is ejected by a knock-out pin (not shown) which is conventional in the art.

The preferred method of operation of mold means 10 to produce fitting 100' will now be described together with particular examples.

Molten plastic is introduced into the mold means 10 through the sprue in the hot cavity, with both hot and cold cavities in the closed position shown in FIG. 1, and the core means also in the fully closed position shown in FIG. 1. The coolant fluid is passed through slip cores 20, 20a, 20b, via coolant passages 54, 54a, and 54b, and exits via slip core bores 29, 29a, 29b.

When the molten plastic defining the bell ends 131, 131a, 131b, attains a predetermined temperature within a given temperature range, within which the plastic forming the bell ends is resiliently deformable, the cavity 11 is opened, and the timed three stage retraction of the external core pieces 40, 40a, 40b, the internal core pieces 30, 30a, 30b, and the slip core means 20, 20a and 20b commences.

At this point, in the retraction cycle, the external core pieces 40, 40a, 40b are first axially retracted, in a first stage pull-out, to achieve the maximum extended position shown for example, in FIG. 2, wherein the external core piece 40 is completely removed from the bell end exterior surface 131. The internal core pieces 30, 30a, 30b are next axially removed, in a second-stage pull-out, from the interior of the bell ends 131, 131a, 131b, the maximum extent of second stage retraction being shown in FIG. 3. It is to be noted that substantial deformation of bell end 131, 131a, 131b must take place during the second state pull-out as seen in FIG. 3; however, the deformation is temporary only since the temperature of the material and the short time at which it is subjected to such temperature renders the material sufficiently resilient and it returns to its originally molded shape, after the second stage retraction is completed.

The third stage of retraction, wherein the slip core pieces 20, 20a, 20b are fully retracted from the cavity means, is commenced immediately after completion of second stage retraction. The molded fitting 100' is then ejected from the cold cavity side 11a.

No appreciable deformation of the body portions 110', 110b of the fitting 100' takes place during first, second and third stage retraction because a substantial part of the body portions 110' and 110b are cooled to a temperature at which they are substantially rigid and non-deformable.

The temperature and rate of passage of the coolant fluid through the slip cores 20, 20a and 20b is such that, at the time that the bell ends 131, 131a and 131b attain the temperature range at which they are resiliently deformable, the longitudinal cylindrical sections 112, 112a of the body portion 110' are cooled to a substantially lower temperature range at which they are substantially rigid and non-deformable. The central area 113, however, remains pliable. These various conditions are readily achieved because of the insulation of the bell ends 131, 131a and 131b and central area 113 from the coolant by the variety of insulation means earlier described.

Also, the walls of outer annular lips 150, 150a, 150b of the bell ends 131, 131a, 131b are provided with a thickness greater than the wall thickness of the longitudinal sections 112, 112a and the body portion 110b and act as a heat sink to more effectively enable retention of heat in the bell ends to achieve the condition of resilient deformation at the time of commencement of the retraction cycle.

By way of specific example, PVC is introduced into the mold means 10 at a temperature of between about 300°-400° F. The core retraction cycle commences when the bell ends 131, 131a, 131b attain a temperature range of between about 220°-280° F.; and at this time, the cylindrical sections 112, 112a of body portions 110' and body portion 110b are cooled to a lower temperature range of between about 150° F.-200° F.

The preferred injection molding temperature of polyethylene lies between about 250° F.-350° F. It is believed that the core retraction cycle will commence when the bell ends 131, 131a, 131b attain a temperature range of between about 180°-260° F. and at the time, the sections 112, 112a of body portions 110' and body portions 110b are preferably cooled to a lower temperature range of between 120°-170° F.

The injection molding temperature of an unmodified polypropylene lies between 400° F. and 550° F. It is believed that the retraction cycle will commence when the bell ends attain a temperature range of between about 270° F.-370° F. and at this time, the sections 112, 112a of portions 110' and body portion 110b are preferably cooled to a lower temperature range of between about 200°-250° F.

The preferred injection molding temperature of a high impact ABS resin lies between about 360° and 460° F. It is believed that the core retraction cycle is commenced when the bell ends 131, 131a, 131b attain a temperature of between about 250°-350° F.; and at this time the sections 112, 112a of body portions 110' and body portion 110b are preferably cooled to a lower temperature range of between about 180°-230° F.

Upon completion of the retraction cycle in the above examples, the fitting 100' is ejected, and the mold means closed awaiting injection of fresh molten plastic for the next mold cycle.

In the higher temperature ranges cited, at which the core retraction cycle is initiated, the plastic material is perhaps 50-55% cured and is therefore still resiliently deformable. However, at the lower temperature ranged cited, the plastic material is almost fully cured, e.g., 80-95% cured and is substantially rigid and not deformable.

It is preferred that there be a temperature differential of at least about 30° F. and 100° F. between the bell ends and the sections 112, 112a of body portion 110' and body portion 110b (and optimally about 40°-70° F. difference) at the time that the core retraction cycle is commenced. The pliable central area 113, however, has a temperature that lies between the bell end temperature and the temperature of cylindrical sections 112, 112a of body portion 110'.

As earlier discussed, the three stage retraction of the core means preferably commences after the cavity means 11 has been opened; however, it is possible to construct the mold means in such a way that the core means may be retracted in a three-stage operation prior to opening of the cavity means 11.

In the presently preferred mode of operation, one half of each retaining ring 140, 140a, 140b resides in the cold cavity side 11a of the cavity means, during retraction of the external core pieces 40, 40a, 40b and internal core pieces 30, 30a, 30b. In this way, the longitudinal cylindrical sections 112, 112a and body portion 110b (which are usually substantially rigid and non-deformable) are positively prevented from being displaced, or deformed, during the retraction of the internal core pieces 30, 30a, 30b.

The Tee fitting 100' may be employed in the form ejected wherein the body portion 110' is generally cylindrical throughout its length. However, it is preferred that the body portion 110 have a generally spherical segment molded therein to withstand, to a greater degree, fluid pressure in the fitting. To this end, the fitting 100' is taken, exactly as formed in mold means 10, and placed in a second mold means 210, for the purpose of applying pressure to the central portion 113 of fitting 100' in order to form a generally spherical segment, designated 213 in the finished Tee pipe fitting 100.

Figure 4:
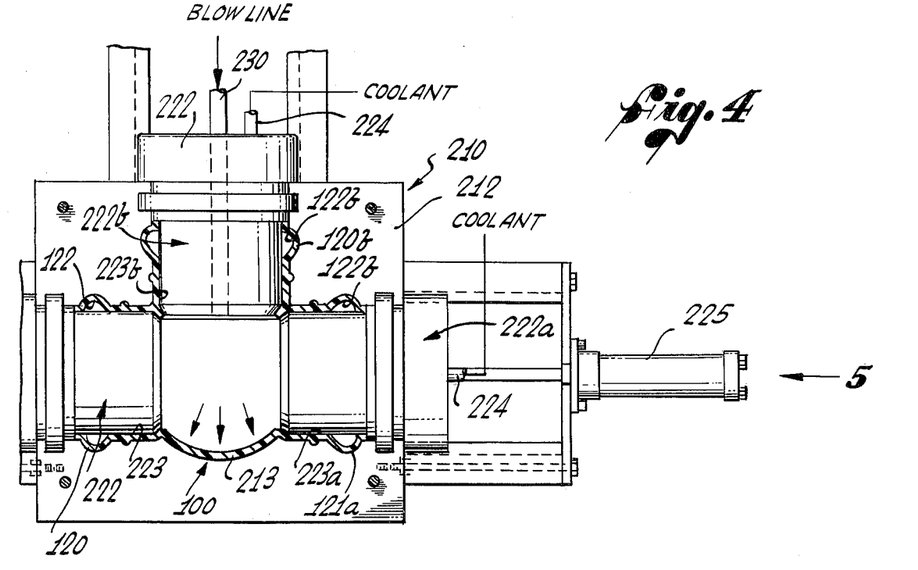
FIG. 4 is a fragmentary side elevational view, in axial cross section of a second mold means, showing the formation of a generally spherical segment in the molded part of FIG. 1.

It will be recalled that central area 113 of body portion 110' in fitting 100' is maintained at a higher temperature than the cylindrical body portions 112, 112a, so that, at the time of ejection of the fitting 100' the central plastic area will still be pliable. The fitting 100' in this condition, is immediately placed in the second mold means 210, comprising a split means 212, 214, one half of which (side 212) is shown in FIG. 4 in axial side elevation.

Core means 222, 222a, 222b are next inserted, through each of the ends of the fitting 100' hydraulically, e.g., by means of hydraulic cylinder means 225, schematically shown, to close off all plastic areas of the fitting 100' except the central plastic area 113. Initially, the core means 222, 222a, 222b has a slight interference fit with the fitting 100'. The core means 222, 222a, 222b have cylindrical surfaces 223, 223a, 223b, respectively about which the body portions 112, 112a and 110b of fitting 100' contract as the fitting 100' cools. It will be noted that the cylindrical core surfaces 223, 223a, 223b, provide bridging members across the annular grooves 122, 122a, 122b, formed within the bell ends 120, 120a, 120b of the fitting 100'. The core means 222, 222a, 222b do not have any race-forming surfaces thereon since the forming of the bell ends 131, 131a, and 131b are completed and their contraction is effectively inhibited by the aforesaid bridging members provided by the core surfaces 223a, 223b and 223.

The shaping of central plastic area 113 requires that air under a pressure of, for example, 85-100 psi be supplied through one of the core means, e.g., 222c, indicated by the blow line pipe 230, to displace the still pliable central plastic are 113 against the spherical surface of the cavity means 212, 214.

As the spherical segment 213 is being formed, under air pressure, each core means 222 and cavity means 212, 214 has coolant fluid passing therethrough in order to cool the entire pipe fitting 100'. Passage means 224 and 229 are provided, in each of core means 222 and cavity means 212, 214 for this purpose.

After air, at ambient temperature, is supplied through blow line 230 for approximately several minutes, and coolant fluid supplied to cool the fitting 100' the cavity means 210 is opened, the core means 222a, 222b, 222c retracted and the finished part 100 ejected. The part 100, ejected is almost fully cured, but in order to achieve a practically 100% cure, the part 100 may be further cooled in a water bath for 3 to 5 minutes.

The use of a second mold means, following the first molding operation in mold means 10, greatly increases the efficiency of producing the finished part 100 even in those cases where no further pressure or blow molding operations are required, i.e., when essentially the final form of the fitting is molded in the first mold means. For the core means, 222a, 222b, 222c of the second mold means assures concentricity of the molded fitting, as it is being cooled, and thus more positively assures quality control, of the part during postcuring.

Further, the more expensive first mold means is most efficiently employed to form fittings as quickly as possible, eject them, and post-cure them in the second mold means — rather than permitting a long residence time of the part in the first mold means. The residence time of the molded part in the second mold means is reduced by employing the water bath as the last post-curing operation in the process.

While various embodiments of our invention have been described and shown herein, we intend to be limited only by the claims which follow.

We claim:

1. A method for forming a hollow thermoplastic article, having an enlarged bell end with an inner annular groove therein, and a body portion having at least a longitudinal section thereof of smaller inner diameter than the diameter of said inner annular groove of said bell end, which comprises the steps of:

introducing molten plastic into a hollow article forming mold means including a cavity means and core means which cavity and core means together, in closed position, define said bell end and said body portion, said core means being movable, with respect to said cavity means, from a closed position to at least one partially retracted position and thence to a fully retracted position clear of said cavity means and said cavity means being openable to enable said article to be ejected from said cavity means;

cooling the molten plastic of at least a first part of said body portion, while said mold means is in closed position, to a first temperature range within which said plastic forming said first part of said body portion is substantially rigid and non-deformable and, cooling the molten plastic forming said bell end, while said mold means is in closed position, to a second temperature range in which said plastic forming said bell end remains resiliently deformable, said second temperature range being substantially higher than said first temperature range;

in sequence, partially retracting said core means to thereby remove said core means defining said bell end with some elastic deformation of said bell end while the plastic forming said bell end lies within said second higher temperature range and is still readily deformable and said first part of said body portion lies within said first lower temperature range and then, fully retracting said core means; and ejecting said formed thermoplastic article from said cavity means before said bell end has cooled to a substantially rigid condition to allow said bell end to recover to its undeformed shape.

2. The method of claim 1 which includes the step of opening said cavity means just prior to said partial retraction of said core means.

3. The method of claim 1 which includes the step of opening said cavity means at some time after retraction of said core means has commenced.

4. The method of claim 1 wherein the average difference in temperature between the first temperature range of said first part of said body portion and the second temperature range of said bell end is between about 30° to about 100° F. at the time that said partial retraction of said core means is commenced.

5. The method of claim 1 wherein said plastic material is PVC.

6. The method of claim 1 wherein said plastic material is an ABS polymer.

7. The method of claim 1 wherein said plastic material is a polyethylene.

8. The method of claim 1 wherein said plastic material is a styrene-butadiene polymer.

9. The method of claim 1 wherein said plastic material is PVC, and at least said first part of said body portion is cooled to a first temperature range of between about 150° F. and 200° F. at the time of said partial retraction of said core means, and said bell end is cooled to a second temperature range of between about 200° F. and about 280° F. at the time of said partial retraction of said core means.

10. The method of claim 1 wherein said plastic material is formed from an ABS resin, and at least said first part of said body portion is cooled to a first temperature range of between about 180° F. and about 240° F. at the time of said partial retraction of said core means, and said bell end is cooled to a second temperature range of between about 250° F. and about 350° F. at the time of said partial retraction of said core means.

11. The method of claim 1 wherein said plastic material is formed from a polyethylene resin and at least said first part of said body portion is cooled to a first temperature range of between about 120° F. and 170° F. at the time of said partial retraction of said core means, and said bell end is cooled to a second higher temperature range of between about 180° F. and about 260° F. at the time of said partial retraction of said core means.

12. The method of claim 1 wherein said plastic material is formed from a polypropylene resin and at least said first part of said body portion is cooled to a first temperature range of between about 200° F. and about 250° F. at the time of said partial retraction of said core means, and said bell end is cooled to a second higher temperature range of between about 270° F. and about 370° F. at the time of said partial retraction of said core means.

13. The method of claim 1 wherein cooling fluid is passed through that portion of the core means defining said first part of said body portion of said hollow article to cool said first part of said body portion to temperatures within said first temperature range at the time of partial retraction of said core means.

14. The method of claim 13 wherein said cooling fluid is insulated from said plastic forming said bell end to maintain said bell end of said hollow article at a temperature within said second temperature range at the time of partial retraction of said core means.

15. The method of claim 1 wherein said first part of said body portion being rapidly cooled is that section of said body portion which is of smaller diameter with respect to the diameter of said inner annular groove of said bell end.

16. A method for forming a hollow thermoplastic article, having an original molded shape with an enlarged bell end with an inner annular groove therein, and a body portion having at least a first longitudinal section thereof of smaller inner diameter than the diameter of said inner annular groove of said bell end and having a second longitudinal section thereof in the form of a generally spherical segment, which comprises the steps of:
  introducing molten plastic into a hollow article forming mold means which includes a cavity means and core means which cavity and core means together, in closed position, define said bell end and said first longitudinal section of said body portion, said core means being movable, with respect to said cavity means, from said closed position to at least one partially retracted position and thence to a fully retracted position clear of said cavity means and said cavity means being openable to enable said article to be ejected from said cavity means;
  rapidly cooling the molten plastic of said first longitudinal section of said body portion, while said mold means is in closed position, to a first temperature range within which said plastic forming said first section of said body portion is substantially rigid and non-deformable, and, simultaneously
  cooling the molten plastic forming said bell end at a slower rate than said first body portion, while said mold means is in closed position, to a second temperature range in which said plastic forming said bell end remains resiliently deformable, said second temperature range being substantially higher than said first temperature range, and also simultaneously
  cooling said second longitudinal section of said body portion at a slower rate than said first body portion to a pliable state, while said mold means is in closed position;
  in sequence, opening said cavity means, partially retracting said core means to thereby remove said core means defining said bell end with some elastic deformation of said bell end while the plastic forming said bell end lies within said second higher temperature range and is still readily deformable and said first longitudinal section of said body portion lies within said first lower temperature range and then, fully retracting said core means;
  ejecting said formed thermoplastic article from said opened cavity means while said plastic forming said generally spherical segment is still pliable; and
  applying pressure, to said still pliable plastic, in a second mold means, to form said second longitudinal section into said generally spherical segment.

17. The method of claim 16 wherein the average difference in temperature between the first temperature of said first part of said body portion and the second temperature range of said bell end is between about 30° to about 100°0 F. at the time that said partial retraction of said core means is commenced.

18. The method of claim 16 wherein said plastic material is PVC.

19. The method of claim 16 wherein said plastic material is an ABS polymer.

20. The method of claim 16 wherein said plastic material is a polyethylene.

21. The method of claim 16 wherein said plastic material is a styrene-butadiene polymer.

22. The method of claim 16 wherein said plastic material is PVC, and at least said first part of said body portion is cooled to a first temperature range of between about 150° and 200° F. at the time of said partial retraction of said core means, and said bell end is cooled to a second temperature range of between about 220° F. and about 280° F. at the time of said partial retraction of said core means.

23. The method of claim 16 wherein said plastic material is formed from an ABS resin, and at least said first part of said body portion is cooled to a first temperature range of between about 180° F. and about 240° F. at the time of said partial retraction of said core means, and said bell end is cooled to a second temperature range of between about 250° F. and about 350° F. at the time of said partial retraction of said core means.

24. The method of claim 16 wherein said plastic material is formed from a polyethylene resin and at least said first part of said body portion is cooled to a first temperature range of between about 120° F. and 170° F. at the time of said partial retraction of said core means, and said bell end is cooled to a second higher temperature range of between about 180° F. and about 260° F. at the time of said partial retraction of said core means.

25. The method of claim 16 wherein said plastic material is formed from a polypropylene resin and at least said first part of said body portion is cooled to a first temperature range of between about 200° F. and about 250° F. at the time of said partial retraction of said core means, and said bell end is cooled to a second higher temperature range of between about 270° F. and about 370° F. at the time of said partial retraction of said core means.

26. The method of claim 16 including the additional steps of:
    further cooling said thermoplastic article, while in said second mold means; and
    ejecting said finally formed thermoplastic article from said second mold means.

27. The method of claim 16 including the additional steps of:
    further cooling said thermoplastic article, while in said second mold means, around a second core means, to maintain concentricity of said formed thermoplastic article at areas other than said area of said generally spherical segment; and
    ejecting said finally formed thermoplastic article from said second mold means.

28. The method of claim 16 including the additional steps of:
    further cooling said thermoplastic article, while in said second mold means, around a second core means, to maintain concentricity of said formed thermoplastic article at areas other than said area of said generally spherical segment;
    ejecting said finally formed thermoplastic article from said second mold means; and
    finally cooling said thermoplastic article in a water bath.

29. A method for forming a thermoplastic article having an enlarged bell end with an inner groove and a body portion having at least a section thereof of smaller inner diameter than the diameter of said inner groove, which comprises the steps of:
    heating thermoplastic material to a temperature where said material is resiliently deformable;
    molding said material to form said article by disposing the heated thermoplastic material around a first and second molding means, said first molding means forming said bell end of said hollow and said second molding means forming said body portion of said hollow;
    cooling said second molding means to cause the thermoplastic material adjacent to said second molding means to cool to a temperature range where said thermoplastic material is substantially rigid and non-deformable;
    cooling said first molding means to cause said thermoplastic material adjacent to said first molding means to be cooled to a second temperature range in which said thermoplastic material remains resiliently deformable, said second temperature range being substantially higher than said first temperature range;
    withdrawing said first molding means causing elastic deformation of said bell end; and
    withdrawing said second molding means and allowing said bell end to recover to its undeformed shape before said bell end has cooled to a substantially rigid condition.

* * * * *